(12) United States Patent
Kuramori

(10) Patent No.: US 8,099,215 B2
(45) Date of Patent: Jan. 17, 2012

(54) STEERING OPERATION FORCE DETECTING APPARATUS

(75) Inventor: Akira Kuramori, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 276 days.

(21) Appl. No.: 12/375,925

(22) PCT Filed: Apr. 15, 2008

(86) PCT No.: PCT/JP2008/057316
§ 371 (c)(1),
(2), (4) Date: Jan. 30, 2009

(87) PCT Pub. No.: WO2008/133099
PCT Pub. Date: Nov. 6, 2008

(65) Prior Publication Data
US 2010/0030429 A1    Feb. 4, 2010

(30) Foreign Application Priority Data

Apr. 20, 2007  (JP) ................................. 2007-111416

(51) Int. Cl.
*B62D 1/04* (2006.01)
*G01L 5/22* (2006.01)

(52) U.S. Cl. ........................................... 701/41; 701/29

(58) Field of Classification Search ........................ None
See application file for complete search history.

(56) References Cited

U.S. PATENT DOCUMENTS

| | | | | |
|---|---|---|---|---|
| 2005/0006170 A1* | 1/2005 | Dirrig | ............................ | 180/446 |
| 2007/0062753 A1* | 3/2007 | Yoshida et al. | ............... | 180/333 |

FOREIGN PATENT DOCUMENTS

| | | | |
|---|---|---|---|
| JP | 62-198562 | | 9/1987 |
| JP | 4-11567 | * | 1/1992 |
| JP | 5-675 | * | 1/1993 |
| JP | 05-310130 | | 11/1993 |
| JP | 05-345569 | | 12/1993 |
| JP | 2000-500101 | | 1/2000 |
| JP | 2003-535757 | | 12/2003 |
| JP | 2004-271450 | | 9/2004 |
| WO | WO98/05543 | | 2/1998 |
| WO | WO 01/94188 | | 12/2001 |

OTHER PUBLICATIONS

"An Analysis of Steering Maneuverability with Multiple Force Transducer", Mukae, et al., Society of Automotive Engineers of Japan Inc.

* cited by examiner

*Primary Examiner* — Michael J. Zanelli
(74) *Attorney, Agent, or Firm* — Knobbe Martens Olson & Bear LLP

(57) ABSTRACT

A steering operation force detecting apparatus enabling to know in detail a force or a moment applied to a steering wheel rim (steering wheel) gripped by a driver during steering is provided. A force and a moment applied to each divided portion 11A and 11B of a steering wheel rim 11 are detected by force sensors 21A and 21B. Force applied points FP1 and FP2 of driver's hands which grip the divided portions 11A and 11B of the steering wheel rim 11 are detected by contact sensors 22 and an arithmetic processing section. Also, forces and moments at the force applied points FP1 and FP2 are calculated based on the detection results, and the calculation results are output to a higher-level device. Accordingly, it is possible to know in detail how much force or moment is applied to the force applied points FP1 and FP2 on the steering wheel rim 11 during a steering operation.

8 Claims, 12 Drawing Sheets

STEERING OPERATION FORCE DETECTING APPARATUS

This application is the U.S. National Phase under 35 U.S.C. §371 of International Application PCT/JP2008/057316, filed Apr. 15, 2008, which claims priority to Japanese Patent Application No. 2007-111416, filed Apr. 20, 2007. The International Application was published under PCT Article 21(2) in a language other than English.

TECHNICAL FIELD

The present invention relates to a steering operation force detecting apparatus for detecting an operation force applied to a steering wheel at the time of steering a vehicle or the like.

BACKGROUND ART

It becomes increasingly important to know the sense of driving during steering by a driver in the performance evaluation or the like of new-model cars and tires. In this case, it is considered to be effective in the performance evaluation or the like to know in detail a force or a moment applied to a steering wheel rim (steering wheel) gripped by a driver during steering.

As a conventionally known detecting apparatus for detecting a force applied to the steering wheel rim (steering wheel) of a vehicle, there are known an apparatus for detecting the position of hands on a steering wheel, which is disclosed in National Publication of International Patent Application No. 2003-535757 (Patent Document 1), a steering wheel with an opto-electronic sensor, which is disclosed in National Publication of International Patent Application No. 2000-500101 (Patent Document 2), and an apparatus for evaluating steering operability by the analysis of a hand force, which is disclosed in Society of Automotive Engineers of Japan, Inc., Preprints of Meeting on Automotive Engineers, No. 55-03, P13-16 (Non-Patent Document 1).

In the apparatus disclosed in the Patent Document 1, sensors are provided in a steering wheel for a vehicle having a steering ring, a hub, and at least one spoke connecting the steering ring and the hub to detect a force applied to a steering wheel rim (steering wheel). The sensors used in the apparatus are divided into plural segments arranged successively in the longitudinal direction of the steering ring. Also, the sensors extend over the entire length of the steering ring and are arranged distributed over the periphery of the steering ring. By arranging the sensors as described above, the position of hands on the steering wheel can be detected by the sensors.

In the apparatus disclosed in the Patent Document 2, an optical sensor including an optical fiber which is wound around a steering wheel for controlling a vehicle is provided. By detecting a change in light signal passing through the optical fiber, the state in which a driver grips the steering wheel is detected.

An apparatus enabling to measure torque during steering by providing a torque sensor in a steering wheel hub is also known.

Patent Document 1: National Publication of International Patent Application No. 2003-535757
Patent Document 2: National Publication of International Patent Application No. 2000-500101

DISCLOSURE OF THE INVENTION

Problems to be Solved by the Invention

As described above, it becomes increasingly important to know the sense of driving during steering by a driver in the performance evaluation or the like of new-model cars and tires. In this case, it is considered to be effective in the performance evaluation or the like to know in detail a force or a moment applied to a steering wheel rim (steering wheel) gripped by a driver during steering.

However, there is not known an apparatus for detecting how much force or moment is applied to a steering wheel by the steering operation of a driver, or how much force or moment is applied to a position on the steering wheel which the driver grips when the driver actually performs steering.

The present invention has been made in view of the aforementioned problems, and it is an object of the present invention to provide a steering operation force detecting apparatus enabling to know in detail a force or a moment applied to a steering wheel rim (steering wheel) gripped by a driver during steering.

Means for Solving the Problems

In order to achieve the above object, the present invention proposes a steering operation force detecting apparatus including: a steering wheel rim constituting a steering wheel and divided into at least two portions in a steering direction; a plurality of steering arms coupling each of the divided portions of the steering wheel rim and a steering wheel hub; first detecting means provided in each of the steering arms for detecting a force and a moment applied to each of the divided portions of the steering wheel rim; second detecting means for detecting a force applied point of a driver's hand which grips the divided portions of the steering wheel rim; arithmetic calculation means for calculating a force and a moment at the force applied point based on each detection result of the first detecting means and the second detecting means; and calculation result output means for outputting a calculation result by the arithmetic calculation means.

With the steering operation force detecting apparatus of the present invention, the force and the moment applied to each of the divided portions of the steering wheel rim are detected by the first detecting means. Also, the force applied point of the driver's hand which grips the divided portions of the steering wheel rim is detected by the second detecting means. Moreover, the force and the moment at the force applied point are calculated based on the detection results, and the calculation result is output. Accordingly, it is possible to know in detail how much force or moment is applied to the force applied point on the steering wheel rim during a steering operation.

Also, the present invention proposes the steering operation force detecting apparatus, characterized in that the second detecting means includes a sensor for detecting the force applied point arranged in each of the divided portions of the steering wheel rim.

With the steering operation force detecting apparatus of the present invention, the force applied point is detected by the sensor arranged in each of the divided portions of the steering wheel rim.

Also, the present invention proposes the steering operation force detecting apparatus, characterized in that the sensor for detecting the force applied point includes a plurality of contact sensors for detecting the presence or absence of contact of the driver's hand with the steering wheel rim, and the second detecting means includes means for obtaining the force applied point by the presence or absence of contact obtained by the contact sensors.

With the steering operation force detecting apparatus of the present invention, the presence or absence of contact of the driver's hand with the steering wheel rim is detected by the contact sensors arranged in each of the divided portions of the steering wheel rim. Moreover, the force applied point is obtained by the presence or absence of contact obtained by the contact sensors.

Also, the present invention proposes the steering operation force detecting apparatus, characterized in that the second detecting means includes means for obtaining the force applied point based on a distribution of the presence or absence of contact obtained by the plurality of contact sensors.

With the steering operation force detecting apparatus of the present invention, the presence or absence of contact of the driver's hand with the steering wheel rim is detected by the contact sensors arranged in each of the divided portions of the steering wheel rim. Moreover, the force applied point is obtained based on the distribution of the presence or absence of contact obtained by the contact sensors.

Also, the present invention proposes the steering operation force detecting apparatus, characterized in that the sensor for detecting the force applied point includes means for detecting a contact pressure of the driver's hand at a plurality of positions on the steering wheel rim, and the second detecting means includes means for outputting a detection result of the contact pressure at each of the plurality of positions.

With the steering operation force detecting apparatus of the present invention, the contact pressure of the driver's hand on the steering wheel rim is detected by the contact sensors arranged in each of the divided portions of the steering wheel rim. Moreover, the detection result of the contact pressure obtained by each contact sensor is output.

Also, the present invention proposes the steering operation force detecting apparatus, characterized in that the second detecting means includes means for obtaining the force applied point based on a distribution of the detected contact pressure.

With the steering operation force detecting apparatus of the present invention, the contact pressure of the driver's hand on the steering wheel rim is detected by the contact sensors arranged in each of the divided portions of the steering wheel rim. Moreover, the force applied point is obtained based on the distribution of the contact pressure detected by the contact sensors.

Also, the present invention proposes the steering operation force detecting apparatus, further including: means for detecting a steer angle of the steering wheel; means for transforming a coordinate system representing the force and the moment at the force applied point into a predetermined coordinate system based on the detected steer angle; and means for outputting the force and the moment at the force applied point represented by the transformed coordinate system as a detection result.

With the steering operation force detecting apparatus of the present invention, the steer angle of the steering wheel is detected. The coordinate system representing the force and the moment at the force applied point is transformed into a predetermined coordinate system based on the detected steer angle. Moreover, the force and the moment at the force applied point represented by the transformed coordinate system are output as the detection result.

Advantages of the Invention

With the steering operation force detecting apparatus of the present invention, the force and the moment applied to each of the divided portions of the steering wheel rim are detected by the first detecting means. Also, the force applied point of the driver's hand which grips the divided portions of the steering wheel rim is detected by the second detecting means. The force and the moment at the force applied point are calculated based on the detection results, and the calculation result is output. Therefore, it is possible to know in detail how much force or moment is applied to the force applied point on the steering wheel rim during a steering operation from the result. Accordingly, in the performance evaluation or the like of new-model cars and tires by using the apparatus of the present invention, it is possible to know in detail and in real-time the sense of driving during steering by a driver as the data of the force or the moment applied to the steering wheel rim (steering wheel) gripped by the driver during steering. The present invention can be thereby effectively utilized in the performance evaluation or the like.

Figure 1:
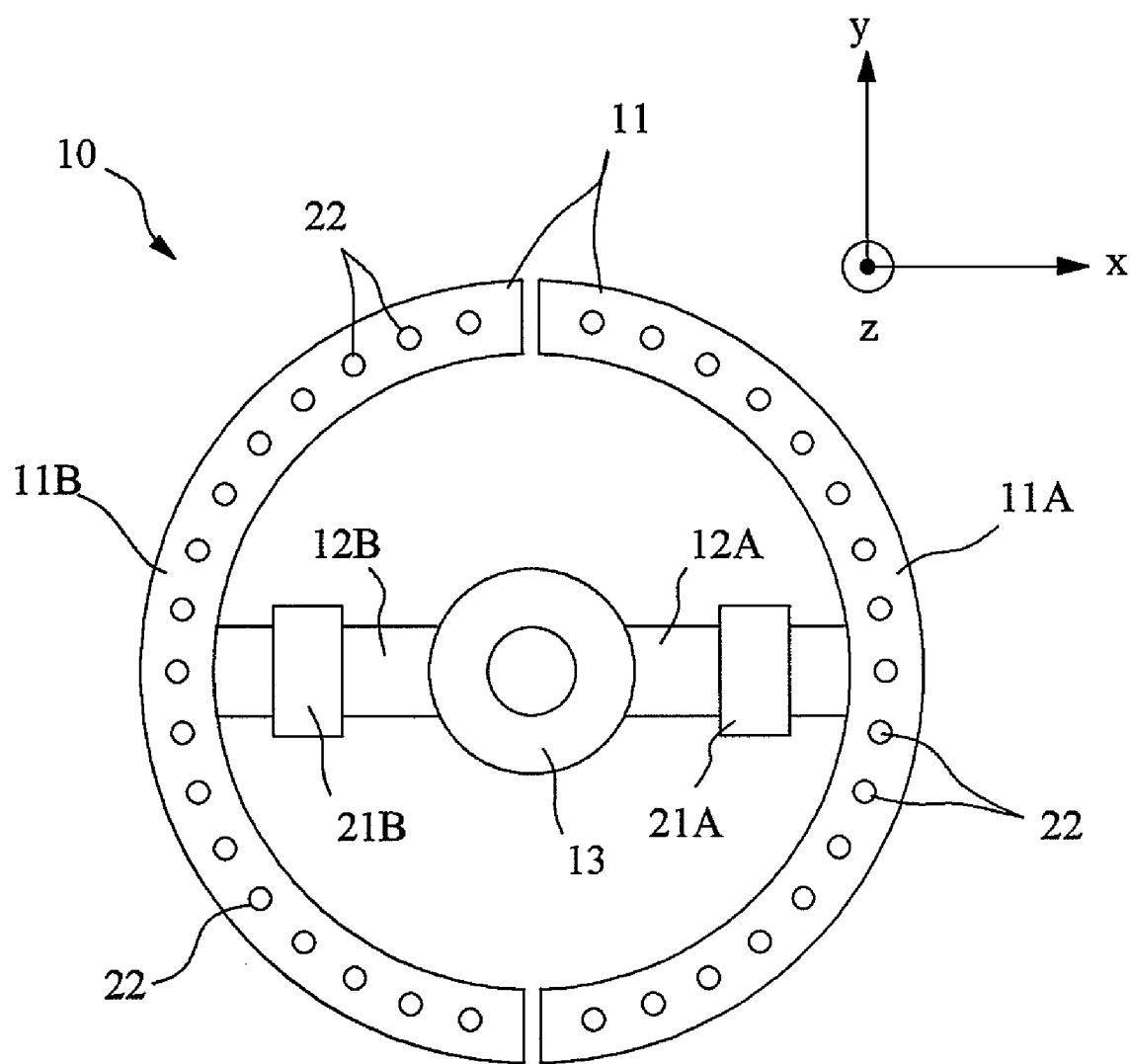
FIG. 1 is a configuration diagram illustrating the main portion of a steering operation force detecting apparatus according to a first embodiment of the present invention.

DESCRIPTION OF SYMBOLS 10, 10B, 10C . . . Steering operation force detecting apparatus
11 . . . Steering wheel rim
11A, 11B . . . Divided portion
12A, 12B . . . Steering arm
13 . . . Steering wheel hub
131: Coordinate origin
132 . . . y axis
20, 20B, 20C . . . Processing unit
21A, 21B . . . Force sensor
22 . . . Contact sensor
23 . . . Sensor interface
24 . . . Arithmetic processing section 25 . . . Storage section
26 . . . Data output section
31 . . . Contact-pressure sensor
32 . . . Sensor interface
33 . . . Arithmetic processing section
34 . . . Storage section
41 . . . Steer angle sensor
42 . . . Sensor interface
43 . . . Arithmetic processing section
44 . . . Storage section

BEST MODE FOR CARRYING OUT THE INVENTION

Next, one embodiment of the present invention will be described in detail with reference to the drawings.

Figure 2:
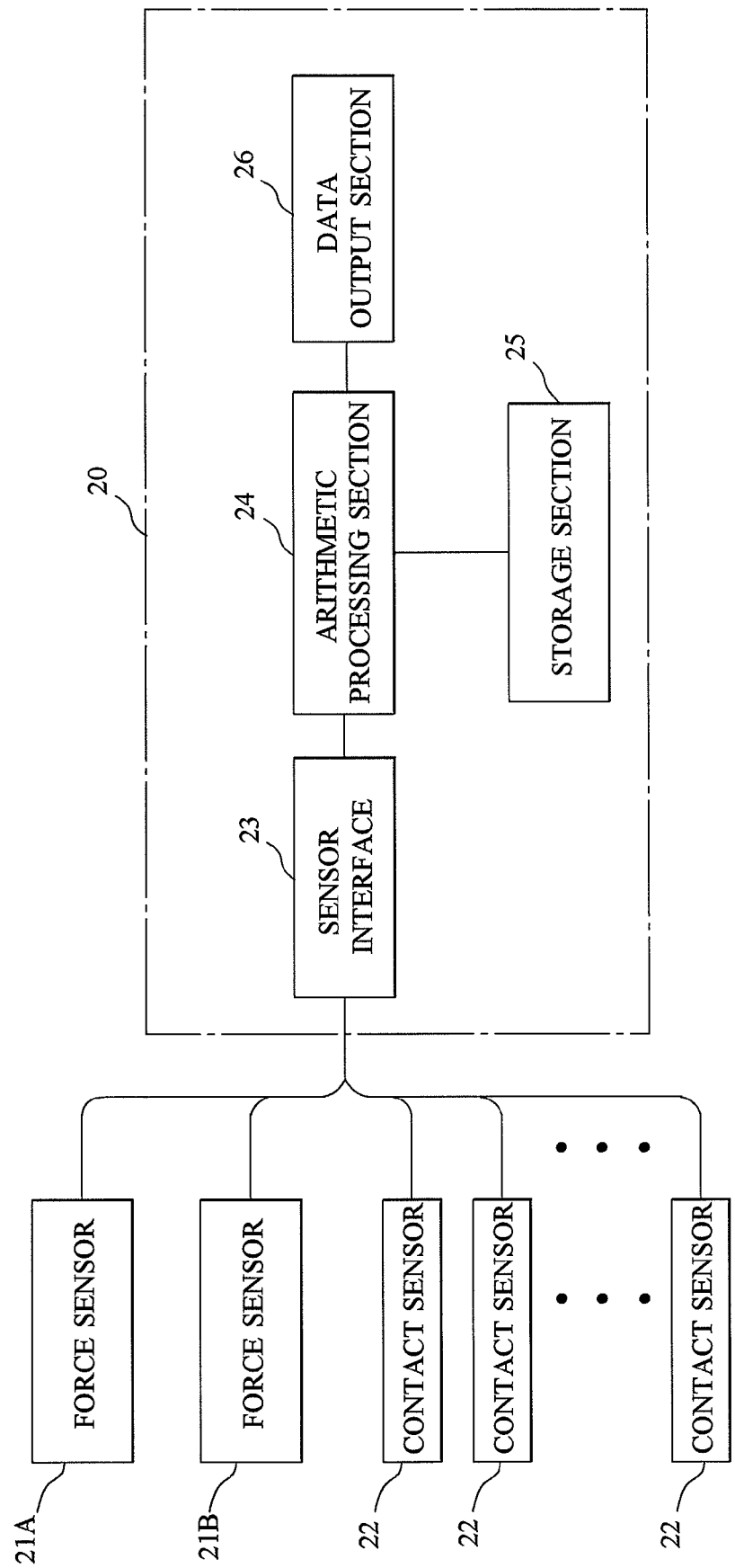
FIG. 2 is a block diagram illustrating an electrical system circuit of the steering operation force detecting apparatus according to the first embodiment of the present invention.
Figure 3:
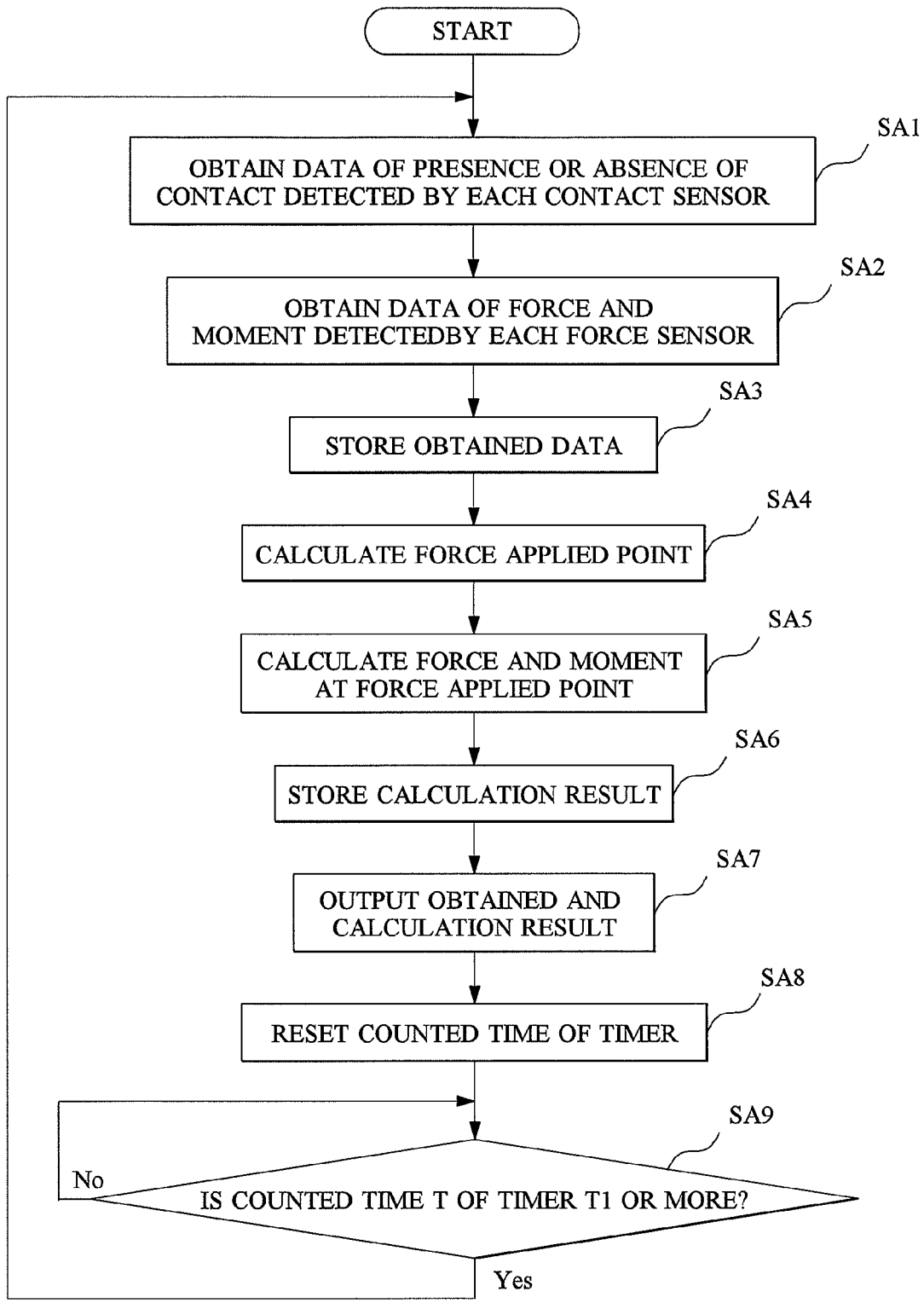
FIG. 3 is a flowchart explaining a processing operation according to the first embodiment of the present invention.
Figure 4:
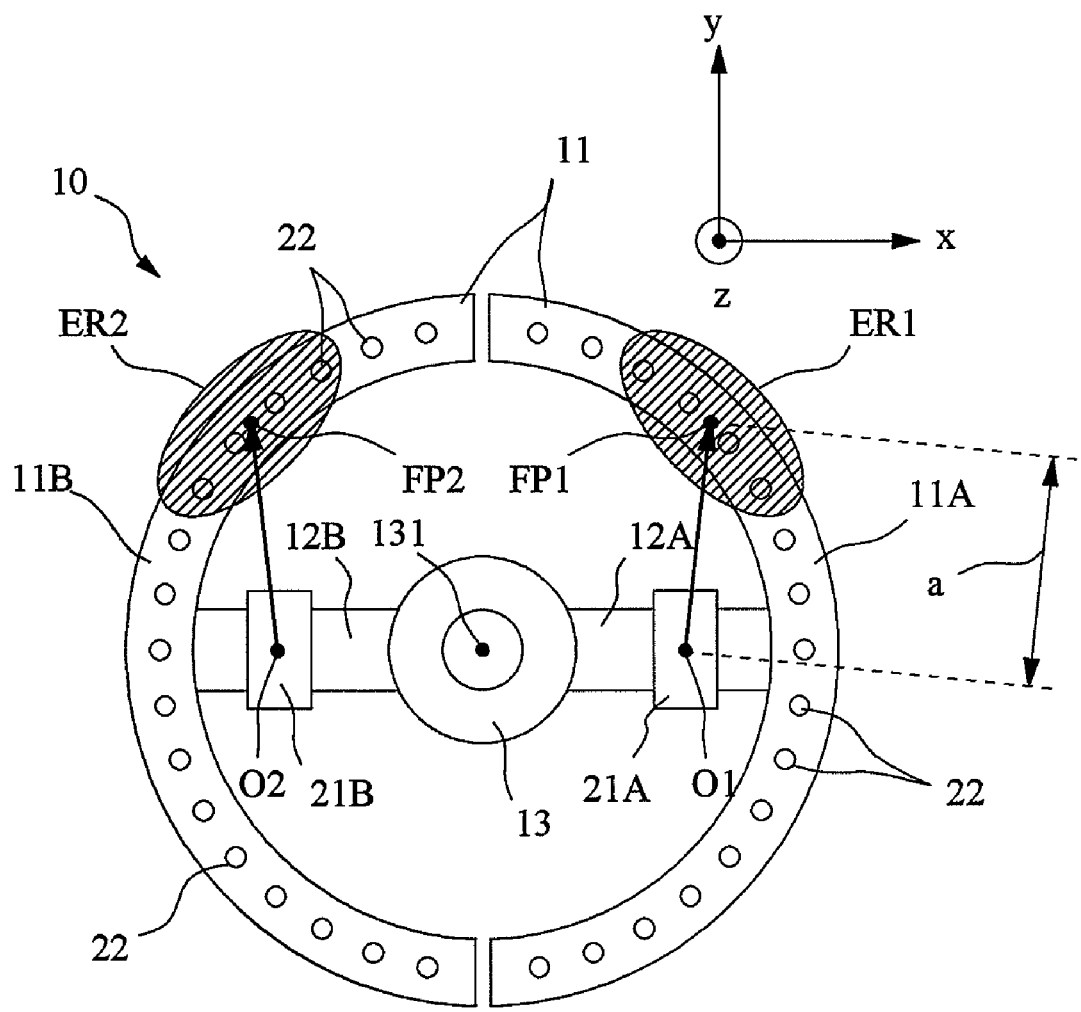
FIG. 4 is a view explaining a detection operation according to the first embodiment of the present invention.

FIGS. 1 to 4 illustrate a first embodiment of the present invention. FIG. 1 is a configuration diagram illustrating the main portion of a steering operation force detecting apparatus according to the first embodiment of the present invention. FIG. 2 is a block diagram illustrating an electrical system circuit of the steering operation force detecting apparatus according to the first embodiment of the present invention. FIG. 3 is a flowchart explaining a processing operation according to the first embodiment of the present invention. FIG. 4 is a view explaining a detection operation according to the first embodiment of the present invention.

In the drawings, reference numeral 10 denotes a steering operation force detecting apparatus, which is constituted by a steering wheel rim 11 (11A, 11B), a steering arm 12 (12A, 12B) coupling the steering wheel rim 11 and a steering wheel hub 13, and a processing unit 20.

The steering wheel rim 11 is equally divided into two portions of the first divided portion 11A and the second divided portion 11B in the steering direction (rotation direction) along a vertical line. The first divided portion 11A is coupled to the steering wheel hub 13 by the steering arm 12A. The second divided portion 11B is coupled to the steering wheel hub 13 by the steering arm 12B.

Also, force sensors 21A and 21B for detecting a force and a moment applied to the steering arms 12A and 12B are provided substantially in each central portion of the steering arms 12A and 12B in the longitudinal direction. A known six-component load cell capable of detecting three component forces in x-axis, y-axis, and z-axis directions orthogonal to each other, and moments around the three axes at the same time is used as the force sensors 21A and 21B, for example. Here, the force sensors 21A and 21B are mounted corresponding to an x, y, z orthogonal coordinate system in which the longitudinal direction of the steering arms 12A and 12B is an x axis and the direction orthogonal to the x axis in the rotational plane of the steering wheel rim 11 is a y axis with the coordinate of a central point 131 (intersection of the plane with the rotation axis) of the steering wheel hub 13 in the rotational plane being the origin.

On the other hand, a plurality of contact sensors 22 are arranged at regular intervals in the circumferential direction in each of the first and second divided portions 11A and 11B of the steering wheel rim 11. The contact sensors 22 are for detecting a position on the steering wheel rim 11 which a driver grips with his/her hands. As the contact sensor 22, a pressure-sensitive sensor, an electrode-type touch sensor, or an optical sensor can be used, for example.

The processing unit 20 includes a sensor interface 23, an arithmetic processing section 24, a storage section 25, and a data output section 26.

The sensor interface 23 supplies driving power to the force sensors 21A, 21B and the plurality of contact sensors 22. Also, electric signals as detection results output from the force sensors 21A, 21B and the plurality of contact sensors 22 are input to the sensor interface 23. The sensor interface 23 outputs the detection result of each sensor to the arithmetic processing section 24 as digital data.

The arithmetic processing section 24 is mainly constituted by a known CPU and a memory, and operates based on a program stored in advance in the memory. Also, the detection result of each sensor is input from the sensor interface 23 to the arithmetic processing section 24 at predetermined time intervals (for example, at one-second intervals). The arithmetic processing section 24 obtains a force applied point described below based on the detection result. Furthermore, the arithmetic processing section 24 calculates a force and a moment at the force applied point, and stores the result in the storage section 25 with the coordinate data of each sensor and the detection time data described below. Moreover, the arithmetic processing section 24 outputs the data to an unillustrated higher-level device via the data output section 26.

Also, the arithmetic processing section 24 deletes the data of the detection results stored in the storage section 25, or outputs the data to the unillustrated higher-level device via the data output section 26 based on the operation of an unillustrated switch or the like.

The data of coordinates O1 and O2 of the detecting central points of the force sensors 21A and 21B and the data of the location coordinate of each contact sensor 22 in the x, y, z orthogonal coordinate system with the coordinate of the central point 131 (intersection of the plane with the rotation axis) of the steering wheel hub 13 in the rotational plane of the steering wheel rim 11 being the origin when the steering wheel rim 11 is in the position obtained when a vehicle is traveling straight are stored in advance in the storage section 25. The arithmetic processing section 24 calculates a distance between the respective coordinates based on the data stored in the storage section 25.

The contact sensors 22 in each of the first and second divided portions 11A and 11B of the steering wheel rim 11 are numbered in order from the one arranged in one end of the divided portions 11A and 11B. The coordinate of each contact sensor 22 is stored corresponding to the number in the storage section 25.

Next, the processing operation of the arithmetic processing section 24 will be described in detail with reference to FIGS. 3 and 4.

The force sensors 21A and 21B detect forces and moments represented by the x, y, z orthogonal coordinate with the detecting central points O1 and O2 being the center, and output the detection result. Also, each of the contact sensors 22 outputs an electric signal indicating the presence or absence of contact of a driver's hand. Only the contact sensors 22 existing in gripped regions ER1 and ER2 by driver's hands output the electric signals indicating the presence of contact.

The arithmetic processing section 24 obtains the data of the presence or absence of contact detected by each contact sensor and the data of the force and the moment detected by each force sensor via the sensor interface 23 (SA1, SA2). The arithmetic processing section 24 stores the respective data in the storage section 25 with the detection time data by correlating the respective data with the coordinate data of each sensor (SA3). Moreover, the arithmetic processing section 24 calculates the coordinates of force applied points FP1 and FP2 based on the detection result of each sensor and the coordinate data of each sensor (SA4), and also, calculates forces and moments applied to the force applied points FP1 and FP2 (SA5). After that, the arithmetic processing section 24 stores the calculation results of the forces and the moments at the force applied points in the storage section 25 with the coordinate data of each sensor and the detection time data described below (SA6). Also, the arithmetic processing section 24 outputs the data to the unillustrated higher-level device via the data output section 26 (SA7).

Next, the arithmetic processing section 24 resets the counted time of a timer (SA8), and starts to count time. When a counted time T of the timer reaches a predetermined time T1 or more (SA9), the process moves to the process of SA1 described above and the above processes are repeated. Although the time T1 is set to one second in the present embodiment, the value of the time T1 is not limited to this value and may be set to any value.

When the coordinates of the force applied points FP1 and FP2 are to be obtained, the arithmetic processing section 24 obtains the central coordinate of the coordinates of all the contact sensors 22 existing in each region of the gripped regions ER1 and ER2 by driver's hands as the coordinates of the force applied points FP1 and FP2.

Also, a force $F_{FP1}$ and a moment $M_{FP1}$ at the force applied point FP1 described above can be calculated by using the following Equation (1) and Equation (2). A force $F_{FP2}$ and a moment $M_{FP2}$ at the force applied point FP2 can be similarly calculated.

$$F_{FP1} = F \quad (1)$$

$$M_{FP1} = M - a \times F \quad (2)$$

F represents a force detected by the force sensor 21A, M represents a moment detected by the force sensor 21A, and a represents a position vector from the detecting central point of the force sensor 21A to the force applied point F21. The calculation of the force and the moment at the force applied point FP2 is similarly performed as described above.

With the steering operation force detecting apparatus 10 having the above configuration, the force and the moment applied to each of the divided portions 11A and 11B of the steering wheel rim 11 are detected by the force sensors 21A and 21B. Also, the force applied points F21 and F22 of driver's hands which grip the divided portions 11A and 11B of the steering wheel rim 11 are detected using the contact sensors 22. Moreover, the forces and the moments at the force applied points FP1 and FP2 are calculated based on the detection results, and the calculation results are output. Therefore, it is possible to know in detail how much force or moment is applied to the force applied points FP1 and FP2 on the steering wheel rim 11 during a steering operation. Accordingly, in the performance evaluation or the like of new-model cars and tires by using the apparatus of the present invention, it is possible to know in detail and in real-time the sense of driving during steering by a driver as the data of the forces or the moments applied to the steering wheel rim (steering wheel) 11 gripped by the driver during steering. The present invention can be thereby effectively utilized in the performance evaluation or the like of new-model cars and tires.

Next, a second embodiment of the present invention will be described.

Figure 5:
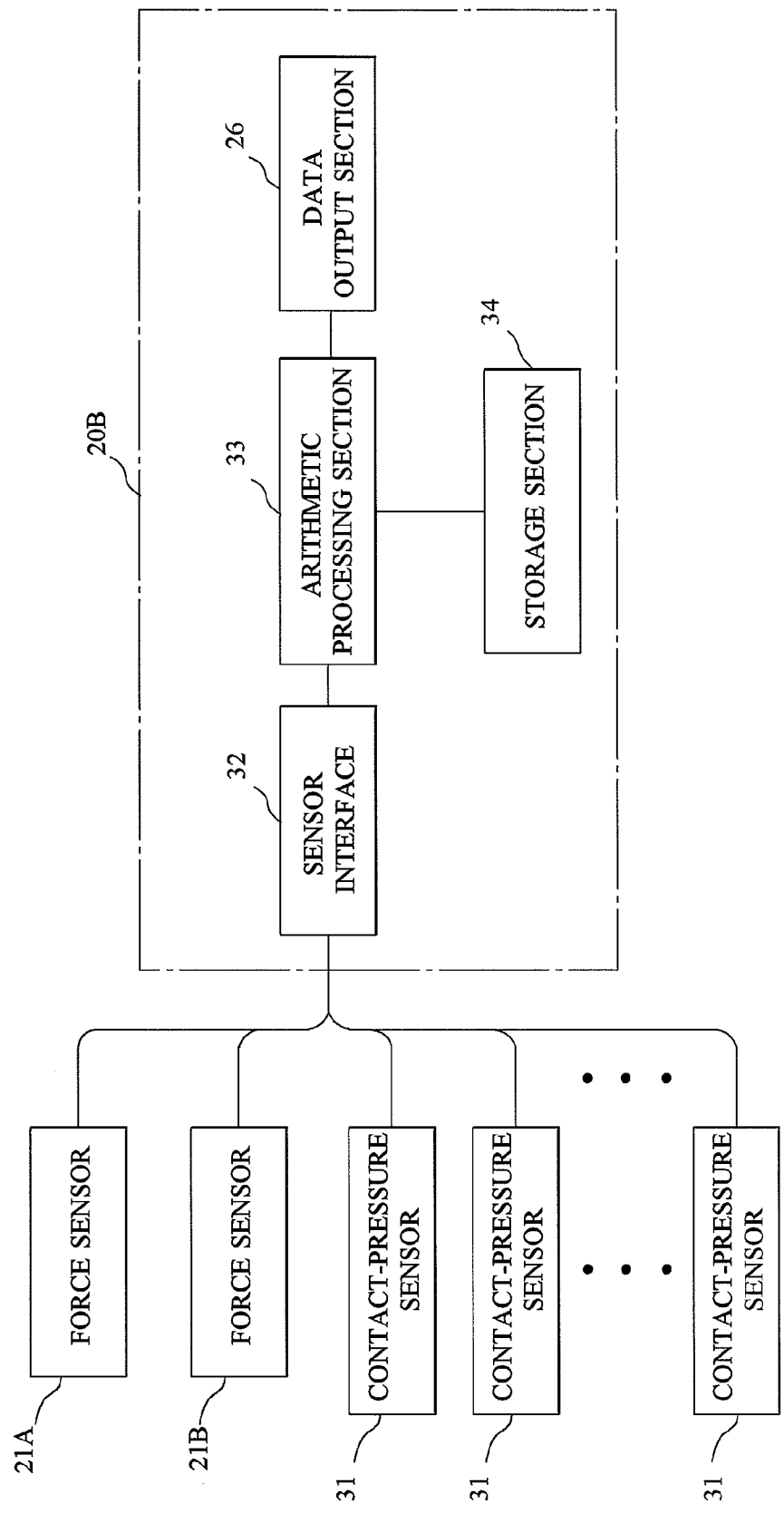
FIG. 5 is a block diagram illustrating an electrical system circuit of a steering operation force detecting apparatus according to a second embodiment of the present invention.
Figure 6:
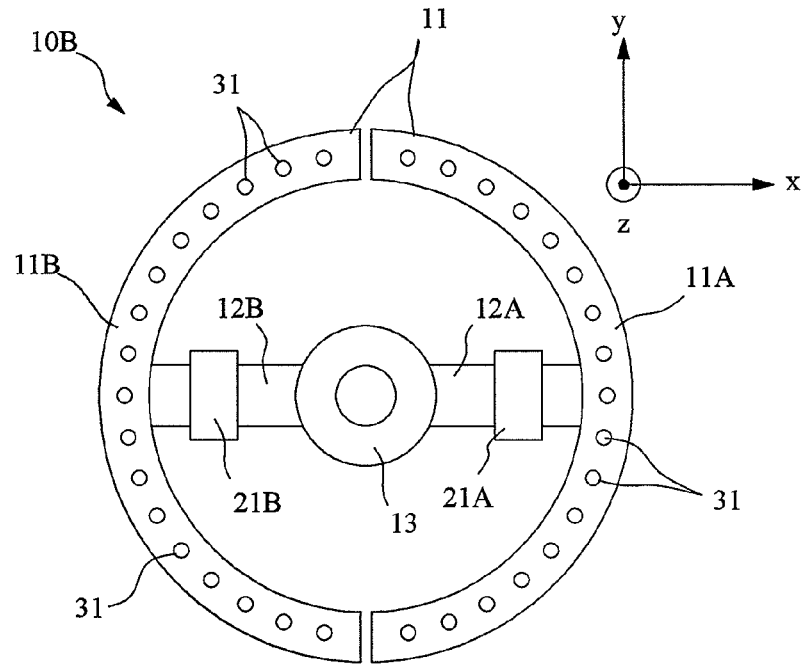
FIG. 6 is a configuration diagram illustrating the main portion of the steering operation force detecting apparatus according to the second embodiment of the present invention.
Figure 7:
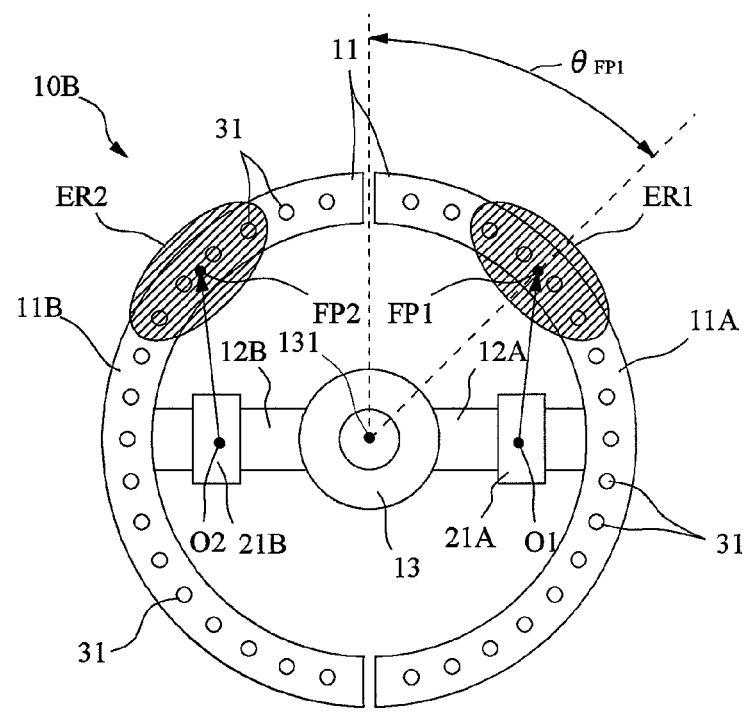
FIG. 7 is a view explaining a detection operation according to the second embodiment of the present invention.
Figure 8:
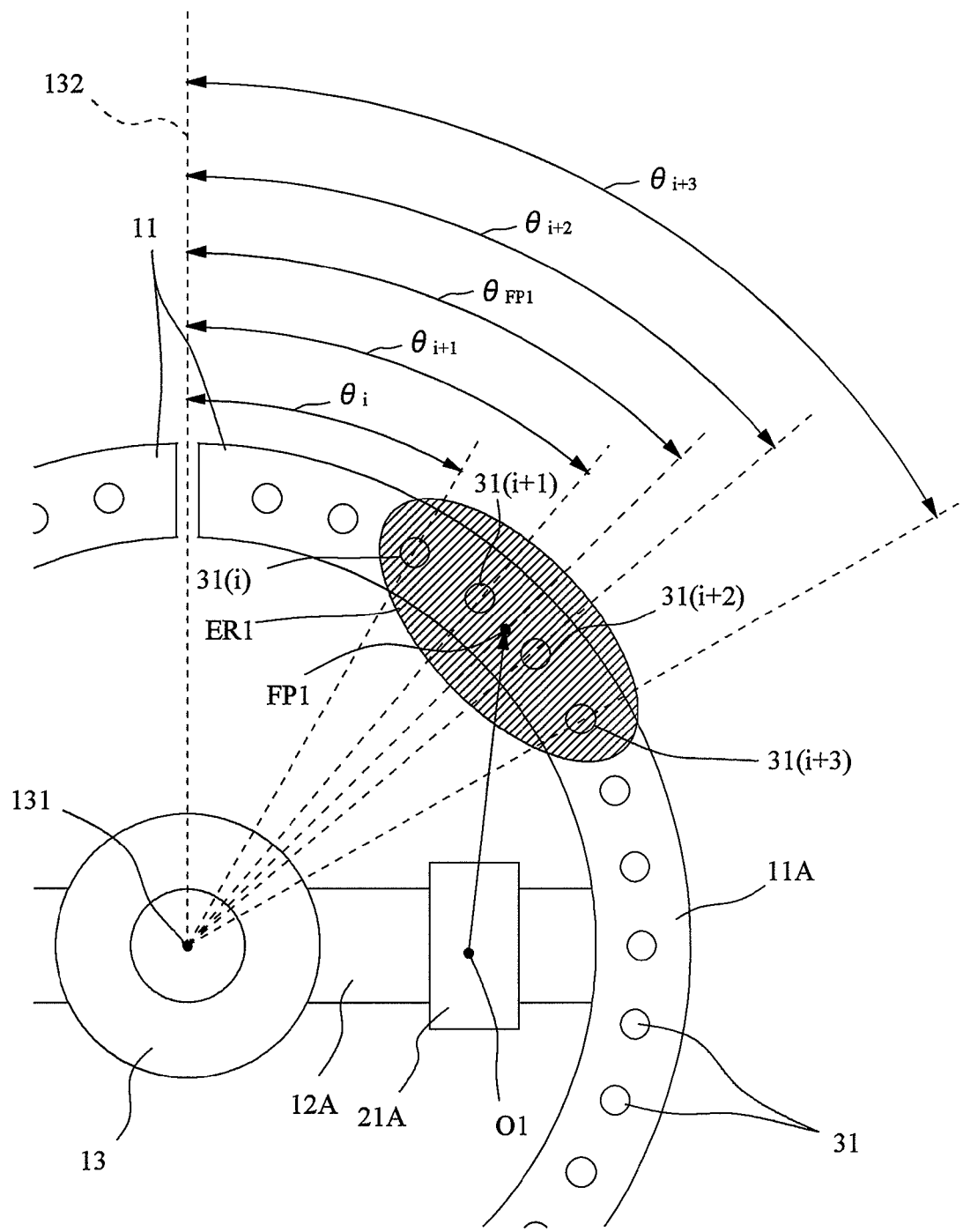
FIG. 8 is a view explaining a detection operation according to the second embodiment of the present invention.
Figure 9:
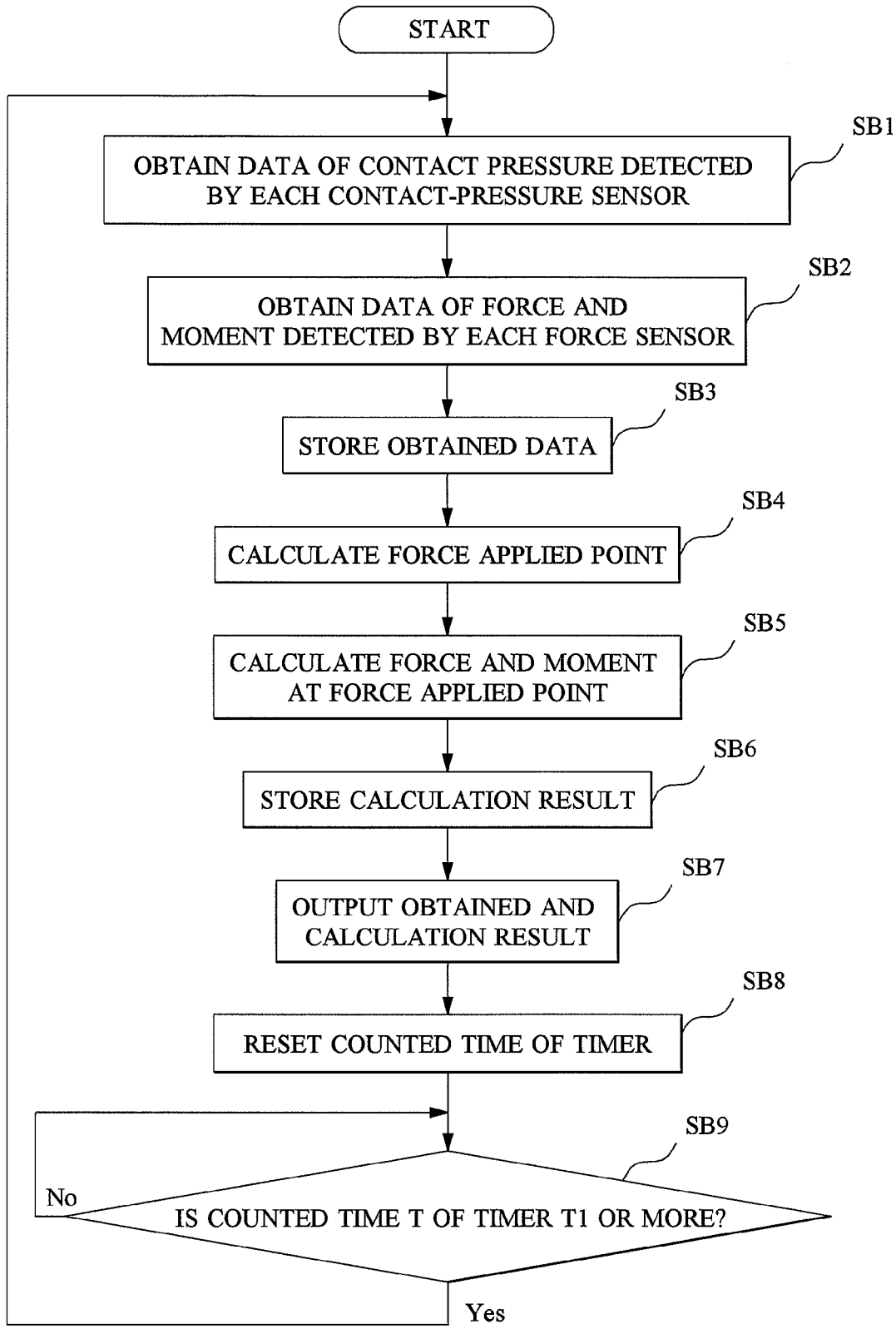
FIG. 9 is a flowchart explaining a processing operation according to the second embodiment of the present invention.

FIGS. 5 to 9 illustrate the second embodiment of the present invention. FIG. 5 is a block diagram illustrating an electrical system circuit of a steering operation force detecting apparatus according to the second embodiment of the present invention. FIG. 6 is a configuration diagram illustrating the main portion of the steering operation force detecting apparatus according to the second embodiment of the present invention. FIGS. 7 and 8 are views explaining a detection operation according to the second embodiment of the present invention. FIG. 9 is a flowchart explaining a processing operation according to the second embodiment of the present invention.

In the drawings, the same components as those in the first embodiment described above are assigned the same reference numerals to omit the description.

In a steering operation force detecting apparatus 10B of the second embodiment, a contact-pressure sensor 31 is provided instead of the contact sensor 22 of the first embodiment, and a processing unit 20B corresponding thereto is provided.

The contact-pressure sensor 31 detects a contact pressure applied to the contact-pressure sensor 31 when a driver grips the steering wheel rim 11, and outputs an electric signal of the detection result to a sensor interface 32.

The processing unit 20B includes the sensor interface 32, an arithmetic processing section 33, a storage section 34, and the data output section 26.

The sensor interface 32 supplies driving power to the force sensors 21A, 21B and a plurality of contact-pressure sensors 31. Also, electric signals as detection results output from the force sensors 21A, 21B and the plurality of contact-pressure sensors 31 are input to the sensor interface 32. The sensor interface 32 outputs the detection result of each sensor to the arithmetic processing section 33 as digital data.

The arithmetic processing section 33 is mainly constituted by a known CPU and a memory, and operates based on a program stored in advance in the memory. Also, the detection result of each sensor is input from the sensor interface 32 to the arithmetic processing section 33 at predetermined time intervals (for example, at one-second intervals). The arithmetic processing section 33 obtains a force applied point based on the contact pressure as described below. Furthermore, the arithmetic processing section 33 calculates a force and a moment at the force applied point, and stores the result in the storage section 34 with the coordinate data of each sensor and the detection time data described below. Moreover, the arithmetic processing section 33 outputs the data to an unillustrated higher-level device via the data output section 26.

Also, the arithmetic processing section 33 deletes the data of the detection results stored in the storage section 34, or outputs the data to the unillustrated higher-level device via the data output section 26 based on the operation of an unillustrated switch or the like.

The data of coordinates O1 and O2 of the detecting central points of the force sensors 21A and 21B and the data of the location coordinate of each contact-pressure sensor 31 in the x, y, z orthogonal coordinate system with the coordinate of the central point 131 (intersection of the plane with the rotation axis) of the steering wheel hub 13 in the rotational plane of the steering wheel rim 11 being the origin when the steering wheel rim 11 is in the position obtained when a vehicle is traveling straight are stored in advance in the storage section 34. The arithmetic processing section 33 calculates a distance between the respective coordinates based on the data.

The contact-pressure sensors 31 in each of the first and second divided portions 11A and 11B of the steering wheel rim 11 are numbered in order from the one arranged in one end of the divided portions 11A and 11B. The coordinate of each contact-pressure sensor 31 is stored corresponding to the number in the storage section 34.

Next, the processing operation of the arithmetic processing section 33 will be described in detail with reference to FIGS. 7 to 9.

The force sensors 21A and 21B detect forces and moments represented by the x, y, z orthogonal coordinate with the detecting central points O1 and O2 being the center, and output the detection result. Also, each of the contact-pressure sensors 31 outputs an electric signal indicating the contact pressure of a driver's hand. Only the contact-pressure sensors 31 existing in gripped regions ER1 and ER2 by driver's hands output the electric signals indicating the contact pressure obtained when gripped by a driver.

The arithmetic processing section 33 obtains the data of the contact pressure detected by each contact-pressure sensor 31 and the data of the force and the moment detected by each force sensor 21A and 21B via the sensor interface 32 (SB1, SB2). The arithmetic processing section 33 stores the respective data in the storage section 34 with the detection time data by correlating the respective data with the coordinate data of each sensor (SB3).

Moreover, the arithmetic processing section 33 calculates the coordinates of force applied points FP1 and FP2 based on the detection result of each sensor and the coordinate data of each sensor (SB4), and also, calculates forces and moments applied to the force applied points FP1 and FP2 (SB5).

In the arithmetic processing section 33 of the present embodiment, in order to obtain the force applied point FP1 in the divided portion 11A, for example, the coordinate of the force applied point FP1 is obtained by using a known weighted average obtained from a contact pressure distribution C:[(θ1, p1), (θ2, p2), (θ3, p3) to (θn, pn)] by the product of an angle θ from a y axis 132 passing through the origin 131 of the orthogonal coordinate to each contact-pressure sensor 31 existing in the gripped region ER1 and a contact pressure p detected by each contact-pressure sensor 31 existing in the gripped region ER1 as shown in FIG. 8. In the gripped region ER1 of FIG. 8, the coordinate of the force applied point FP1 is obtained by using the weighted average obtained from the contact pressure distribution C using an angle θi and a detected pressure pi of a contact-pressure sensor 31i, an angle θ(i+1) and a detected pressure p(i+1) of a contact-pressure sensor 31(i+1), an angle θ(i+2) and a detected pressure p(i+2) of a contact-pressure sensor 31(i+2), and an angle θ(i+3) and a detected pressure p(i+3) of a contact-pressure sensor 31(i+3). The force applied point F22 in the gripped region ER2 is similarly obtained. Also, a pressure peak position in a pressure distribution detected by each contact-pressure sensor 31 may be simply obtained as the force applied point.

After that, the arithmetic processing section 33 stores the calculation results of the forces and the moments at the force applied points in the storage section 34 with the coordinate data of each sensor and the detection time data described below (SB6). Also, the arithmetic processing section 33 outputs the data to the unillustrated higher-level device via the data output section 26 (SB7).

Next, the arithmetic processing section 33 resets the counted time of a timer (SB8), and starts to count time. When a counted time T of the timer reaches a predetermined time T1 or more (SB9), the process moves to the process of SB1 described above and the above processes are repeated.

Also, a force $F_{FP1}$ and a moment $M_{FP1}$ at the force applied point FP1 described above can be calculated by using the Equation (1) and the Equation (2) described above. A force $F_{FP2}$ and a moment $M_{FP2}$ at the force applied point FP2 can be similarly calculated.

With the steering operation force detecting apparatus 10B having the above configuration, the contact pressure of a driver's hand on the steering wheel rim 11 is detected by the contact-pressure sensors 31 arranged in each of the divided portions 11A and 11B of the steering wheel rim 11. Also, the force applied points FP1 and FP2 are obtained based on the contact pressure distribution obtained by the contact-pressure sensors 31. Moreover, the forces and the moments at the force applied points FP1 and FP2 are calculated based on the detection results, and the calculation results are output. Therefore, it is possible to know in detail how much force or moment is applied to the force applied points F21 and FP2 on the steering wheel rim 11 during a steering operation. Accordingly, in the performance evaluation or the like of new-model cars and tires by using the apparatus of the present invention, it is possible to know in detail and in real-time the sense of driving during steering by a driver as the data of the forces or the moments applied to the steering wheel rim (steering wheel) 11 gripped by the driver during steering. The present invention can be thereby effectively utilized in the performance evaluation or the like.

Next, a third embodiment of the present invention will be described.

Figure 10:
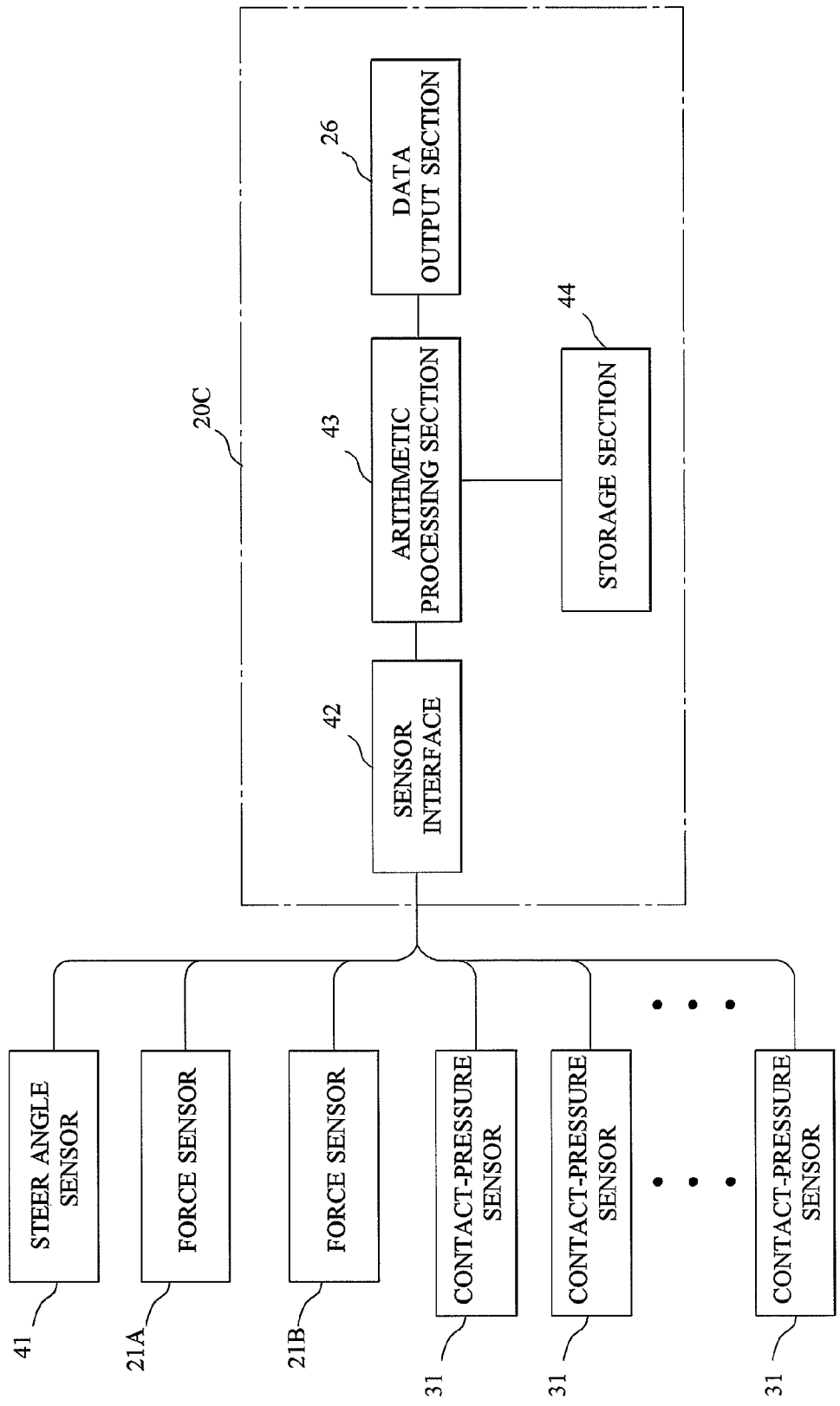
FIG. 10 is a block diagram illustrating an electrical system circuit of a steering operation force detecting apparatus according to a third embodiment of the present invention.
Figure 11:
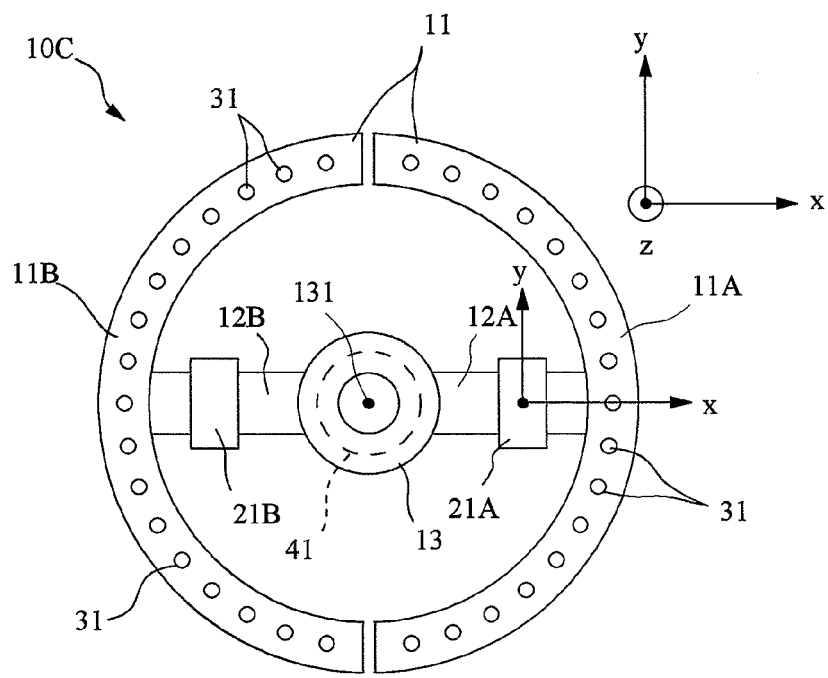
FIG. 11 is a configuration diagram illustrating the main portion of the steering operation force detecting apparatus according to the third embodiment of the present invention.
Figure 12:
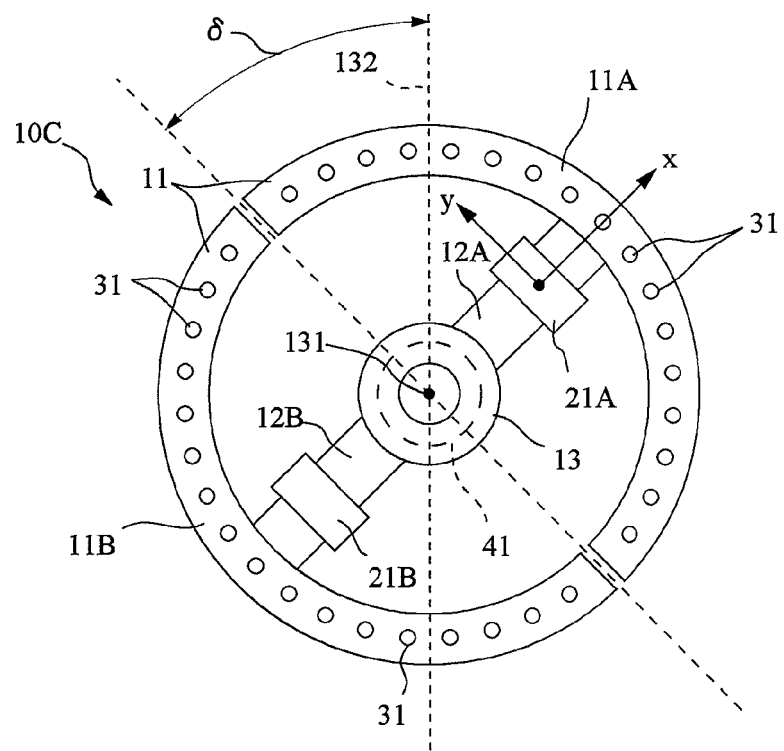
FIG. 12 is a view explaining a detection operation according to the third embodiment of the present invention.
Figure 13:
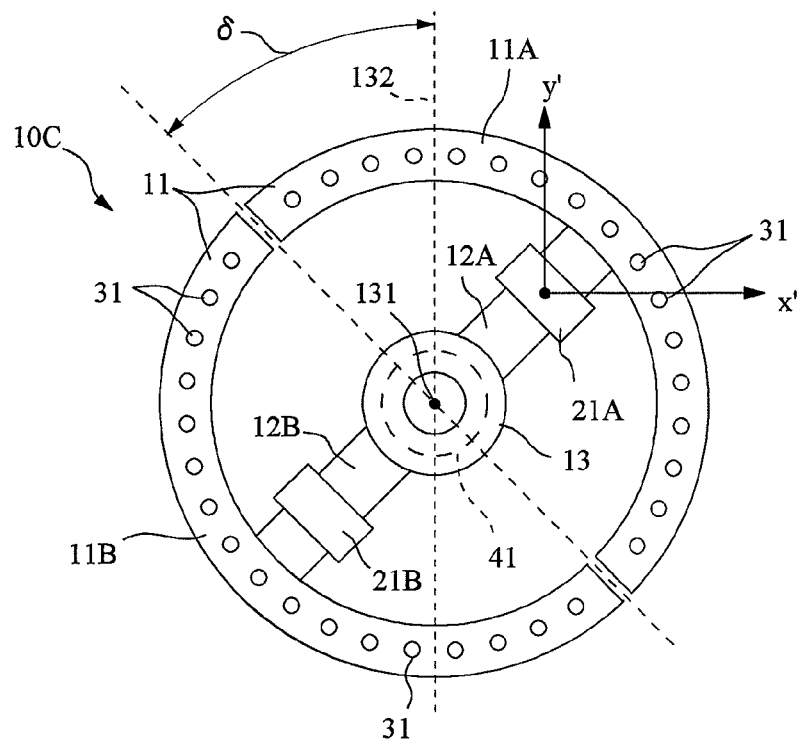
FIG. 13 is a view explaining a detection operation according to the third embodiment of the present invention.
Figure 14:
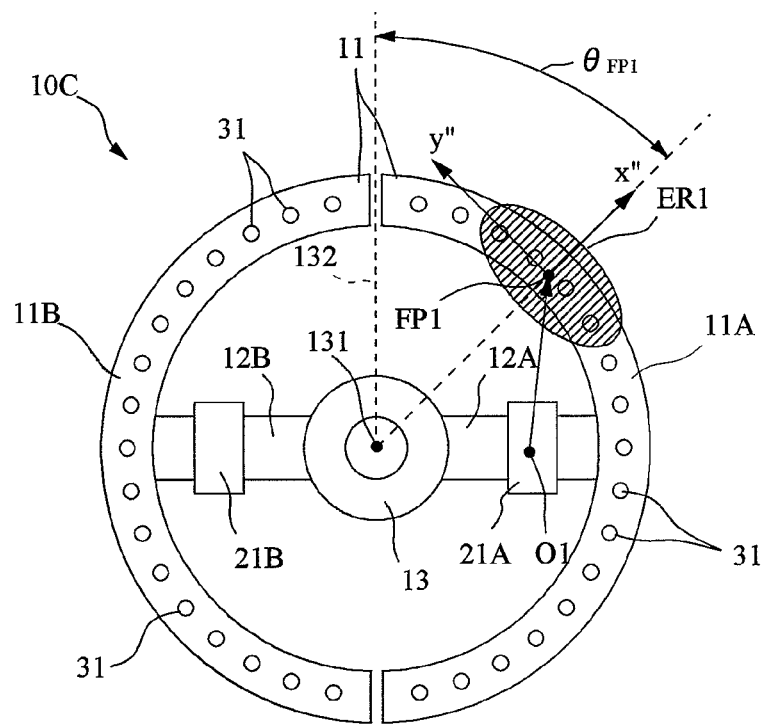
FIG. 14 is a view explaining a detection operation according to the third embodiment of the present invention.
Figure 15:
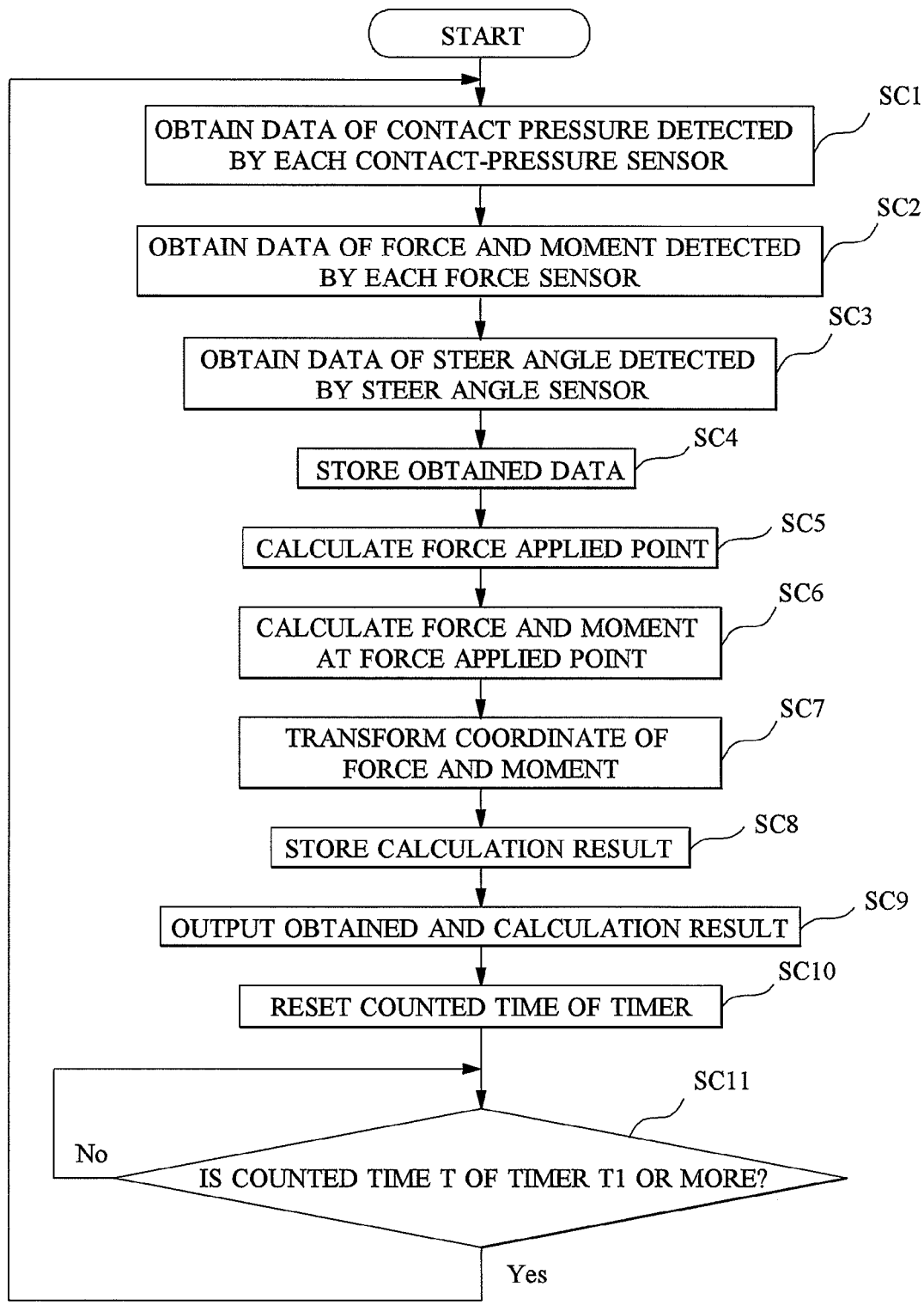
FIG. 15 is a flowchart explaining a processing operation according to the third embodiment of the present invention.

FIGS. 10 to 15 illustrate the third embodiment of the present invention. FIG. 10 is a block diagram illustrating an electrical system circuit of a steering operation force detecting apparatus according to the third embodiment of the present invention. FIG. 11 is a configuration diagram illustrating the main portion of the steering operation force detecting apparatus according to the third embodiment of the present invention. FIGS. 12 to 14 are views explaining a detection operation according to the third embodiment of the present invention. FIG. 15 is a flowchart explaining a processing operation according to the third embodiment of the present invention.

In the drawings, the same components as those in the first and second embodiments described above are assigned the same reference numerals to omit the description.

In a steering operation force detecting apparatus 10C of the third embodiment, a steer angle sensor 41 is provided in addition to the configuration of the second embodiment, and a processing unit 20C corresponding thereto is provided.

The steer angle sensor 41 is provided in the steering wheel hub 13, and detects a steer angle δ of the steering wheel rim 11 to output an electric signal corresponding to the detection result to a sensor interface.

The processing unit 20C includes a sensor interface 42, an arithmetic processing section 43, a storage section 44, and the data output section 26.

The sensor interface 42 supplies driving power to the steer angle sensor 41, the force sensors 21A, 21B and the plurality of contact-pressure sensors 31. Also, electric signals output from the sensors are input to the sensor interface 42. The sensor interface 42 outputs the detection result of each sensor to the arithmetic processing section 43 as digital data.

The arithmetic processing section 43 is mainly constituted by a known CPU and a memory, and operates based on a program stored in advance in the memory. Also, the detection result of each sensor is input from the sensor interface 42 to the arithmetic processing section 43 at predetermined time intervals (for example, at one-second intervals). The arithmetic processing section 43 obtains a force applied point based on the contact pressure as described below. Furthermore, the arithmetic processing section 43 calculates a force and a moment at the force applied point, and stores the result in the storage section 44 with the steer angle δ, the coordinate data of each sensor and the detection time data described below. The arithmetic processing section 43 transforms the coordinates of the force and the moment applied to the force applied point as described below, and stores the data of the coordinates of the force applied point and the force and the moment applied to the force applied point after transformation in the storage section 44. Moreover, the arithmetic processing section 43 outputs the data to an unillustrated higher-level device via the data output section 26.

Also, the arithmetic processing section 43 deletes the data of the detection results stored in the storage section 44, or outputs the data to the unillustrated higher-level device via the data output section 26 based on the operation of an unillustrated switch or the like.

The data of coordinates O1 and O2 of the detecting central points of the force sensors 21A and 21B and the data of the location coordinate of each contact-pressure sensor 31 in the x, y, z orthogonal coordinate system with the coordinate of the central point 131 (intersection of the plane with the rotation axis) of the steering wheel hub 13 in the rotational plane of the steering wheel rim 11 being the origin when the steering wheel rim 11 is in the position obtained when a vehicle is traveling straight are stored in advance in the storage section 44. The arithmetic processing section 43 calculates a distance between the respective coordinates based on the data.

The contact-pressure sensors 31 in each of the first and second divided portions 11A and 11B of the steering wheel rim 11 are numbered in order from the one arranged in one end of the divided portions 11A and 11B. The coordinate of each contact-pressure sensor 31 is stored corresponding to the number in the storage section 44.

Next, the processing operation of the arithmetic processing section 43 will be described in detail with reference to FIGS. 13 to 15.

The force sensors 21A and 21B detect forces and moments represented by the x, y, z orthogonal coordinate with the detecting central points O1 and O2 being the center, and output the detection result. Also, each of the contact-pressure sensors 31 outputs an electric signal indicating the contact pressure of a driver's hand. Only the contact-pressure sensors 31 existing in gripped regions ER1 and ER2 by driver's hands output the electric signals indicating the contact pressure obtained when gripped by a driver.

The arithmetic processing section 43 obtains the data of the contact pressure detected by each contact-pressure sensor 31, the data of the force and the moment detected by each force sensor 21A and 21B, and the data of the steer angle δ detected by the steer angle sensor 41 via the sensor interface 42 (SC1, SC2, SC3). The arithmetic processing section 43 stores the respective data in the storage section 44 with the detection time data by correlating the respective data with the coordinate data of each sensor (SC4).

Moreover, the arithmetic processing section 43 calculates the coordinates of force applied points FP1 and FP2 based on the detection result of each sensor and the coordinate data of each sensor (SC5), and also, calculates forces and moments applied to the force applied points FP1 and FP2 (SC6).

In the arithmetic processing section 43 of the present embodiment, in order to obtain the force applied point FP1 in the divided portion 11A, for example, the coordinate of the force applied point FP1 is obtained by using a known weighted average obtained from a contact pressure distribution C:[(θ1, p1), (θ2, p2), (θ3, p3) to (θn, pn)] (n is a natural number) by the product of an angle θ from a y axis 132 passing through the origin 131 of the orthogonal coordinate to each contact-pressure sensor 31 existing in the gripped region ER1 and a contact pressure p detected by each contact-pressure sensor 31 existing in the gripped region ER1 as in the second embodiment described above. The force applied point FP2 in the gripped region ER2 is similarly obtained. Also, a pressure peak position in a pressure distribution detected by each contact-pressure sensor 31 may be simply obtained as the force applied point.

After that, the arithmetic processing section 43 stores the calculation results of the forces and the moments applied to the force applied points FP1 and FP2 in the storage section 44 with the coordinate data of each sensor and the detection time data described below, and performs a coordinate transformation of the forces and the moments applied to the force applied points FP1 and FP2 (SC7). In the coordinate transformation, the coordinate is transformed into an x', y', z' orthogonal coordinate in which the horizontal direction in the rotational plane of the steering wheel rim 11 is an x' axis and the direction orthogonal to the x' axis in the plane is a y' axis with the coordinate of the central point 131 (intersection of the plane with the rotation axis) of the steering wheel hub 13 in the rotational plane being the origin.

After that, the arithmetic processing section 43 stores the data of the forces and the moments applied to the force applied points FP1 and FP2 represented by the coordinate-transformed orthogonal coordinate system in the storage section 44 (SC8). Also, the arithmetic processing section 43 outputs the data obtained from each sensor with the detection time data and the calculated data to the unillustrated higher-level device via the data output section 26 (SC9).

Next, the arithmetic processing section 43 resets the counted time of a timer (SC10), and starts to count time. When a counted time T of the timer reaches a predetermined time T1 or more (SC11), the process moves to the process of SC1 described above and the above processes are repeated.

Also, a force $F_{FP1}$ and a moment $M_{FP1}$ at the force applied point F21 described above can be calculated by using the Equation (1) and the Equation (2) described above. A force $F_{FP2}$ and a moment $M_{FP2}$ at the force applied point FP2 can be similarly calculated.

As shown in FIG. 14, the coordinates of a pushing/pulling force, a vertical force and a moment at each of the force applied points FP1 and FP2 may be transformed into an x", y", z" orthogonal coordinate system in which the tangential direction of the steering wheel rim 11 is a y" axis and the normal direction is an x" axis with the force applied points FP1 and FP2 being the origin. Here, the force in the tangential direction is a force for generating steering torque.

With the steering operation force detecting apparatus 10C having the above configuration, the contact pressure of a driver's hand on the steering wheel rim 11 is detected by the contact-pressure sensors 31 arranged in each of the divided portions 11A and 11B of the steering wheel rim 11. Also, the force applied points FP1 and FP2 are obtained based on the contact pressure distribution obtained by the contact-pressure sensors 31. Moreover, the forces and the moments at the force applied points FP1 and FP2 are calculated based on the detection results, and the calculation results are output. Therefore, it is possible to know in detail how much force or moment is applied to the force applied points FP1 and FP2 on the steering wheel rim 11 during a steering operation. Accordingly, in the performance evaluation or the like of new-model cars and tires by using the apparatus of the present invention, it is possible to know in detail and in real-time the sense of driving during steering by a driver as the data of the forces or the moments applied to the steering wheel rim (steering wheel) 11 gripped by the driver during steering. The present invention can be thereby effectively utilized in the performance evaluation or the like of new-model cars and tires.

Each of the embodiments described above is one example of the present invention, and the present invention is not limited to the configuration of each of the above embodiments. Although the steering wheel rim 11 is divided into two portions of the two divided portions 11A and 11B in the above embodiments, the steering wheel rim 11 may be divided into three or more portions, for example. Also, it is preferable that the method of obtaining the force applied points FP1 and FP2, the coordinate system or the like are appropriately determined according to data usage or the like.

INDUSTRIAL APPLICABILITY

It is possible to know in detail how much force or moment is applied to the force applied points on the steering wheel rim during a steering operation from the calculation results of the forces and the moments at the force applied points of driver's hands which grip the divided portions of the steering wheel rim. Accordingly, in the performance evaluation or the like of new-model cars and tires by using the apparatus of the present invention, it is possible to know in detail and in real-time the sense of driving during steering by a driver as the data of the forces or the moments applied to the steering wheel rim (steering wheel) gripped by the driver during steering. The present invention can be thereby effectively utilized in the performance evaluation or the like of new-model cars and tires.

The invention claimed is:

1. A steering operation force detecting apparatus, characterized by comprising:
    a steering wheel rim constituting a steering wheel and divided into at least two portions in a steering direction;
    a plurality of steering arms coupling each of the divided portions of the steering wheel rim and a steering wheel hub;
    first detecting means provided in each of the steering arms for detecting a force and a moment applied to each of the divided portions of the steering wheel rim;
    second detecting means for detecting a force applied point of a driver's hand which grips the divided portions of the steering wheel rim;
    arithmetic calculation means for calculating a force and a moment at the force applied point based on each detection result of the first detecting means and the second detecting means; and
    calculation result output means for outputting a calculation result by the arithmetic calculation means.

2. The steering operation force detecting apparatus according to claim 1, characterized in that
    the second detecting means comprises a sensor for detecting the force applied point arranged in each of the divided portions of the steering wheel rim.

3. The steering operation force detecting apparatus according to claim 2, characterized in that
    the sensor for detecting the force applied point comprises a plurality of contact sensors for detecting the presence or absence of contact of the driver's hand with the steering wheel rim, and
    the second detecting means comprises means for obtaining the force applied point by the presence or absence of contact obtained by the contact sensors.

4. The steering operation force detecting apparatus according to claim 2, characterized in that
    the sensor for detecting the force applied point comprises means for detecting a contact pressure of the driver's hand at a plurality of positions on the steering wheel rim, and
    the second detecting means comprises means for outputting a detection result of the contact pressure at each of the plurality of positions.

5. The steering operation force detecting apparatus according to claim 3, characterized in that
    the second detecting means comprises means for obtaining the force applied point based on a distribution of the presence or absence of contact obtained by the plurality of contact sensors.

6. The steering operation force detecting apparatus according to claim 3, characterized in that
    the sensor for detecting the force applied point comprises means for detecting a contact pressure of the driver's hand at a plurality of positions on the steering wheel rim, and
    the second detecting means comprises means for outputting a detection result of the contact pressure at each of the plurality of positions.

7. The steering operation force detecting apparatus according to claim 6, characterized in that
    the second detecting means comprises means for obtaining the force applied point based on a distribution of the detected contact pressure.

8. The steering operation force detecting apparatus according to claim 1, characterized by comprising:
    means for detecting a steer angle of the steering wheel;
    means for transforming a coordinate system representing the force and the moment at the force applied point into a predetermined coordinate system based on the detected steer angle; and
    means for outputting the force and the moment at the force applied point represented by the transformed coordinate system as a detection result.

* * * * *